United States Patent [19]
West

[11] 3,744,115
[45] July 10, 1973

[54] APPARATUS FOR THE FLANGING OF LINED CONDUIT

[75] Inventor: Walter H. West, Bay City, Mich.

[73] Assignee: The Dow Chemical Company, Midland, Mich.

[22] Filed: Sept. 9, 1971

[21] Appl. No.: 179,117

Related U.S. Application Data
[63] Continuation-in-part of Ser. No. 117,335, Feb. 22, 1971, abandoned.

[52] U.S. Cl. ............................................. 29/243.52
[51] Int. Cl. ............................................. B23p 11/00
[58] Field of Search ............ 29/200 B, 512, 243.52, 29/421, 523; 72/58

[56] References Cited
UNITED STATES PATENTS

| | | | |
|---|---|---|---|
| 2,254,577 | 9/1941 | Nelson | 29/523 UX |
| 3,142,868 | 8/1964 | Blount | 29/512 UX |
| 3,113,377 | 12/1963 | Oakes | 29/523 |
| 3,152,630 | 10/1964 | Nilsson | 29/243.52 |
| 3,595,047 | 7/1971 | Fanning | 72/58 |

Primary Examiner—Charlie T. Moon
Attorney—William M. Yates, Robert B. Ingraham et al.

[57] ABSTRACT

Metal pipe or conduit optionally having a thermoplastic liner is flanged by confining a pipe end and applying internal pressure from a material such as rubber to force the pipe end to form a generally radially extending flange. Both the plastic lining and the metal are sufficiently well-formed to provide satisfactory joints.

6 Claims, 3 Drawing Figures

PATENTED JUL 10 1973 3,744,115

INVENTOR.
Walter H. West
BY
*[signature]*
AGENT

APPARATUS FOR THE FLANGING OF LINED CONDUIT

This application is a continuation-in-part of my co-pending application Ser. No. 117,335, filed Feb. 22, 1971, now abandoned.

Corrosion resistant piping has found wide use, particularly in industry. Glass, stainless steel, ceramic and similar piping is used in many applications. However, for many processes it is eminently satisfactory to apply a thermoplastic lining to a malleable conduit such as a low carbon steel pipe. Malleable corrosion resistant metal piping such as stainless steel is often satisfactory for many chemical applications. Particularly desirable for many applications are stainless steel of thin wall construction such as Schedules 5 and 10. For many applications, a flanged connection is desired. In many instances using lined pipe such flanges are formed by cutting the pipe to a desired length with a portion of the liner protruding, applying a flange to the pipe by either threaded connection or welding and forming the protruding portion of the liner into a radially outwardly extending flange covering the metal flange. In many instances, if the lined metal conduit has a relatively thin wall, it is not satisfactory for the application of screwed flanges. Various compression fittings and joints have been used with thinner walled conduit.

However, it would be desirable if there were available an improved method for the forming of a flange on the end of a lined or unlined pipe or tube.

It would also be desirable if such a flange could be quickly and easily formed for field assembly of conduit components.

It would further be desirable that the plastic lining conform to the configuration of any flange so-formed without splitting, tearing or the like.

These benefits and other advantages in accordance with the present invention are achieved in a method for the formation of a flanged conduit, the conduit being of a malleable metal, applying to the end of the conduit to be flanged a restraining means having a configuration which grasps the external surface of the metallic conduit and encloses the end of the conduit, the restraining means and the conduit end defining an annular space about the end of the conduit, the space having a generally sector-like cross-section, applying hydraulic force within the conduit of sufficient magnitude to bend the conduit into the annular space to form a generally outwardly extending flange.

Also contemplated within the scope of the present invention is an apparatus for the flanging of conduit, the apparatus comprising in cooperative combination a clamp, the clamp adapted to engage the external surface of a conduit to be flanged, a mold member, the mold member defining a generally circular cavity and terminating outwardly in a cove or concave radius, the radius being about the width of the desired flange on the conduit and the depth of the cavity being about equal to the width of the flange desired on the conduit, means to maintain the clamping means and mold member in fixed relationship with the cavity facing the clamping means, a draw bar extending within and through the cavity, the draw bar terminating in a piston generally adjacent the cavity, a deformable solid surrounding the draw bar and having a diameter less than the internal diameter of the conduit to be flanged, a draw bar actuating means adapted to move the piston toward the cavity and distort the deformable solid.

Further features and advantages of the present invention will become more apparent from the following specification taken in connection with the drawing wherein.

Figure 1:
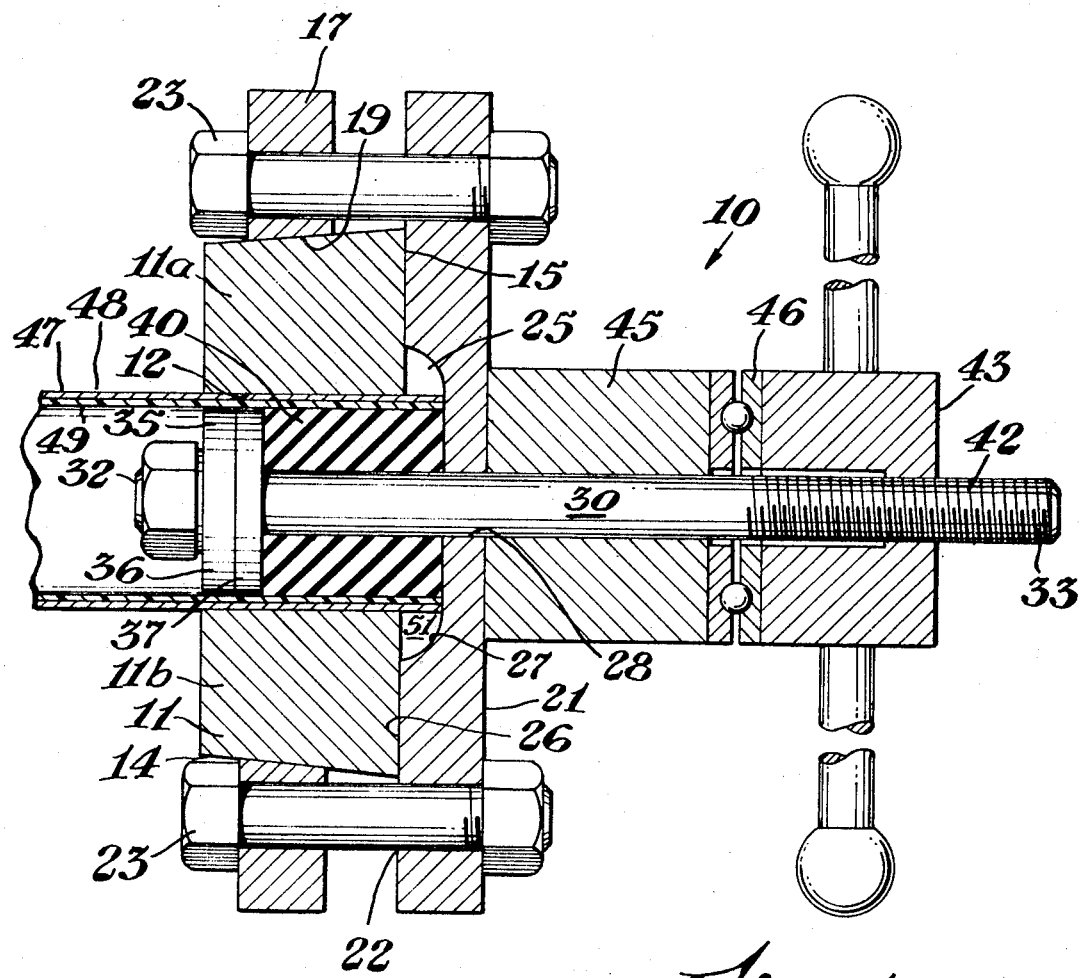
FIG. 1 depicts a schematic cutaway view of apparatus in accordance with the invention.

In FIG. 1 there is depicted an apparatus in accordance with the invention generally designated by the reference numeral 10. The apparatus 10 comprises in cooperative combination a clamp 11. The clamp 11 comprises a first semi-circular body portion 11a and a second semi-circular body portion 11b. The body portions 11a and 11b define an internal passage 12 having a dimension such that a desired size of conduit is rigidly clamped therein when the body portions are in mating engagement. The body 11 has an external tapering surface 14 and a generally flat or radially disposed shaping surface 15. A clamping ring 17 is disposed about the body 11. The ring 17 has an internal tapering surface 19 adapted to engage the surface 14 of the body 11. A molding member 21 is disposed adjacent the clamping member 11. The molding member 21 has defined therein a plurality of peripherally disposed openings or bolt holes 22 through which pass bolts 23 in the ring 17. The molding means 21 has a generally discoidal cavity 25 defined therein and a generally planar surface 26 adapted to engage the clamping member 11. The cavity 25 is of circular configuration and defines a concave surface or cove 27 having a radius which approximates the width of the flange desired to be formed. The molding member 21 defines a generally centrally disposed draw bar passage 28. A draw bar 30 is disposed within the passage 28. The draw bar 30 has a first or piston end 32 and a second or external end 33. A piston member 35 is affixed to the second end 32. Beneficially, the piston member 35 comprises a first portion 36 of a metal such as steel and a second portion 37 of a deflectable solid material such as a plastic; e.g., polytetrafluoroethylene. A hollow cylindrical body 40 is disposed adjacent the plastic portion 37 and about the draw bar 30. The second end 33 of the draw bar 30 has external threads 42 defined thereon which are in operative engagement with a handle 43 which is adapted to be manually grasped and rotated. A sleeve 45 is disposed on the draw bar between the molding member 21 and the handle 43. A thrust bearing 46 operates the handle and the sleeve 45. A lined conduit end 47 is disposed within the passage 12. The lined conduit has an outer or metallic casing 48 and an inner synthetic resinous thermoplastic surface 49. The conduit end 47 in combination with the clamping body 11 and the molding member 21 forms an annular cavity 51 having an axially disposed circular surface and a radially disposed circular surface of about equal linear dimension and an arcuate third surface.

Figure 2:
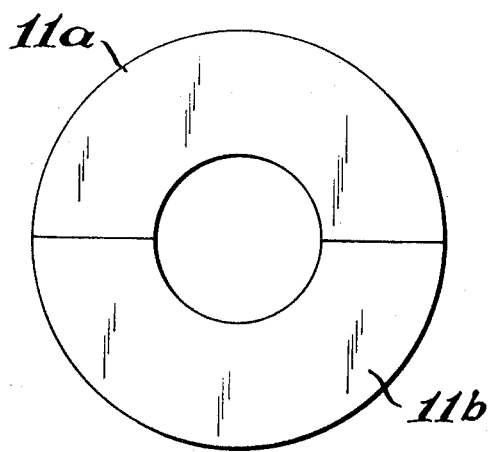
FIG. 2 illustrates the clamping member of the apparatus of FIG. 1.

FIG. 2 depicts the relationship between the portions 11a and 11b of the clamping member 11.

Figure 3:
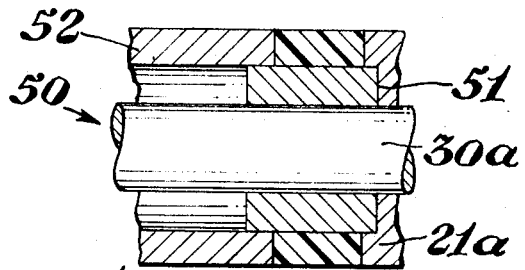
FIG. 3 shows an alternate embodiment of the apparatus of FIG. 1.

FIG. 3 depicts an alternate arrangement 50 to replace the body 40 of FIG. 1. The arrangement 50 comprises a first annular sleeve 51 disposed about a draw bar 50a, and received partially within a locating recess defined in a molding member 21a. A second annular sleeve 52 which can slide over the sleeve 51 is in partial engagement with the exterior cylindrical surface of the sleeve 51 and is disposed remote from the molding member 21a. In operation, movement of the draw bar 30a and a piston (not shown) equivalent to the piston 35 of FIG. 1 forces the sleeve 52 toward the molding member 21a, displacing and deforming the annular body 53 in a generally radially outward direction. The embodiment of FIG. 3 is a particular advantage in the flanging of larger diameter conduit; e.g., nominal 12 inch pipe.

In flanging a conduit employing the apparatus and method of the invention, the apparatus is placed over an end of conduit to be flanged, such as is depicted in FIG. 1. The bolts 23 are tightened which in turn forces the clamping member 11 to engage the external surface of the conduit. The handle 43 is then rotated to draw the piston 35 toward the cavity 25 causing a deformable solid such as vulcanized rubber to be forced into the cavity 25. The deformable solid under pressure behaves as a viscous hydraulic fluid and smoothly forces the conduit end outwardly until it conforms to the surface 15 of the clamping means 11. Employing a deformable solid such as the flexible vulcanized rubber of a consistency very similar to a rubber stopper, it is not necessary to have a liquid-tight seal between the molding member and the conduit end. However, it is important that the radius of the surface 27 closely approximate the bending radius of the metal conduit as it is deformed.

A wide variety of deformable solids are useful in the practice of the present invention. For the flanging of smaller tubes often a one piece rubber plug as the deformable body is convenient. For the flanging of larger tubes, the deformable body beneficially is a plurality of annular discs stacked one on the other to provide an annular body of desired dimension. Alternately, the body is prepared in situ by winding a deformable sheet into the desired configuration. Although many times it is convenient to use a solid body, sheets, discs, cords, tape and granular material are employed with benefit. Granular materials such as crumb rubber with or without a release agent such as powdered talc, polyethylene granules or other pressure deformable solids including plastic and rubbers are of value in the present invention. In the field where it is often undesirable to transport more than minimal equipment and supplies, a particulate reuseable material such as crumb rubber is beneficially treated with talc to prevent bonding. Other useful materials include paraffin wax and polyethylene pellets treated with wax or silicone oil.

Generally for ductile metal conduit such as steel, aluminum, stainless steel, copper and like pipe and tubing, Schedules 5 to 80 lined with a thermoplastic resinous or metallic liner, or unlined, eminently satisfactory flanging is obtained when the surface 27 has a cross-sectional configuration of the arc of a circle centered generally at the bending center of the composite tube to be flanged. However, in general a tool suitable for Schedules 5 to 80 tubing has the center of the arc lying at the center of the wall of Schedule 20 tubing. Beneficially, if it is desirable to anneal the flanged portion of the liner in a plastic lined conduit, a ductile metal retainer is placed over the end of the conduit prior to flanging. The retainer has an annular configuration and a U-shaped cross-section wherein an axially extending annular recess receives the conduit end and the retainer is crimped in place and the conduit is subsequently flanged. Retainers of 10 mil thick copper or aluminum are satisfactory. After flanging, the flanged liners may be heat treated to reduce orientation and the retainer removed, or the retainer left in place until immediately prior to assembly. The retainer is readily removed by tearing, using no more than a pair of pliers. If thin wall tubing is employed in the practice of the present invention, it is oftentimes advantageous to reinforce the portion that is to be flanged by providing additional material to be deformed on the outer surface of the conduit. This is readily accomplished by wrapping with plastic or aluminum pressure sensitive tape. Such reinforcement is of particular value where the conduit wall has undesired thickness variation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An apparatus for the flanging of conduit, the apparatus comprising in cooperative combination
   a clamp, the clamp adapted to engage the external surface of the conduit to be flanged,
   a mold member, the mold member defining
   a generally circular cavity and terminating outwardly in
   a cove or concave radius, the radius being about the width of the desired flange on the conduit and the depth of the cavity being about equal to the width of the flange desired on the conduit,
   means to maintain the clamping means and mold member in fixed relationship with the cavity facing the clamping means,
   a draw bar extending within and through the cavity, the draw bar terminating in
   a piston generally adjacent the cavity, the cavity adapted to receive
   a deformable solid surrounding the draw bar and having a diameter less than the internal diameter of the conduit to be flanged,
   a draw bar actuaring means adapted to move the piston toward the cavity and distort the deformable solid and thereby deform the conduit end within the cavity to form a flange thereon.

2. The apparatus of claim 1 wherein the deformable solid is rubber.

3. The apparatus of claim 1 wherein the draw bar actuating means comprises a handle threadably attached to the draw bar.

4. The apparatus of claim 1 wherein the piston comprises a plastic washer adapted to engage the deformable solid.

5. The apparatus of claim 1 wherein the clamping means comprises first and second semi-circular body portions having an external tapering surface and an inner ring disposed about the tapering surface.

6. The apparatus of claim 1 wherein a first annular sleeve is disposed over the draw bar adjacent the mold member and between the draw bar, and a second annular member is disposed in sliding engagement over the first member.

* * * * *